United States Patent [19]
Caldwell et al.

[11] Patent Number: 5,915,652
[45] Date of Patent: Jun. 29, 1999

[54] METHOD AND APPARATUS FOR RESTRAINING A CARGO BARRIER NET BEAM ASSEMBLY

[75] Inventors: Frank Caldwell, Lakewood; Richard G. Diamante, Downey; Karlton Okamoto, Lakewood, all of Calif.; Todd Ruckert, Centreville, Va.

[73] Assignee: McDonnell Douglas Corporation, Hazelwood, Mo.

[21] Appl. No.: 08/821,787

[22] Filed: Mar. 21, 1997

[51] Int. Cl.⁶ ........................................................ B64D 1/10
[52] U.S. Cl. ........................ 244/121; 244/118.1; 410/118; 248/289.11
[58] Field of Search ................................. 244/121, 118.1, 244/110 C; 248/282.1, 289.11; 403/328, 327, 326; 410/117, 118, 129

[56] References Cited

U.S. PATENT DOCUMENTS

| | | |
|---|---|---|
| 2,375,565 | 5/1945 | Liakopulos . |
| 2,558,058 | 6/1951 | Nelson . |
| 2,669,402 | 2/1954 | Del Mar . |
| 3,486,723 | 12/1969 | Harrison . |
| 3,980,409 | 9/1976 | Turner . |
| 4,073,452 | 2/1978 | Gosau . |
| 5,121,958 | 6/1992 | Goeden et al. . |
| 5,230,485 | 7/1993 | Vogg et al. . |
| 5,560,576 | 10/1996 | Cargill . |

FOREIGN PATENT DOCUMENTS

2913050A1  10/1980  Germany .

*Primary Examiner*—Charles T. Jordan
*Assistant Examiner*—Tien Dinh
*Attorney, Agent, or Firm*—Brooks & Kushman P.C.

[57] ABSTRACT

A cargo barrier net installation for a cargo airplane is connected to the floor and fuselage shell of the aircraft. The cargo barrier net installation includes a pair of C-shaped beams that secure the horizontal net straps to the fuselage. The C-shaped beams have a primary portion that is secured to an existing fitting of cargo planes to attempt to eliminate unrestrained movement of the beam assemblies, which movement can cause damage to the aircraft structure.

3 Claims, 3 Drawing Sheets

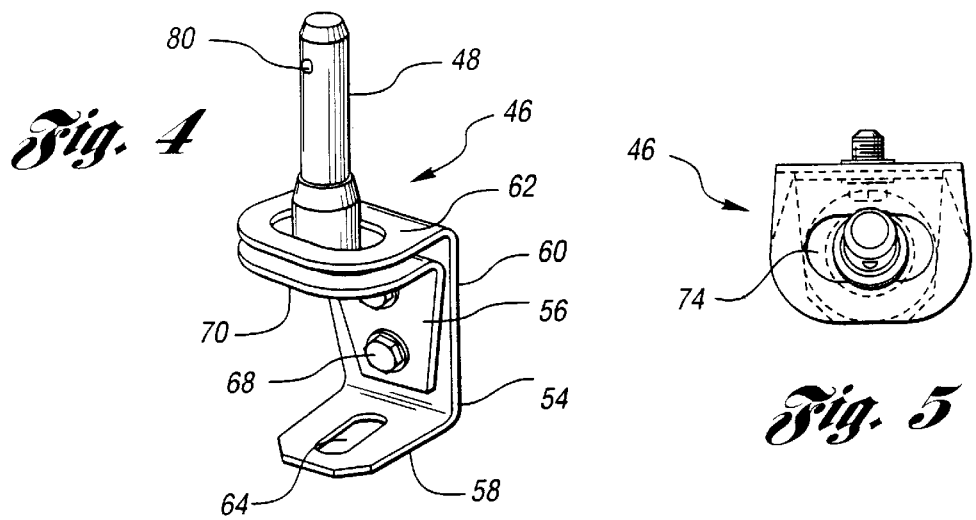
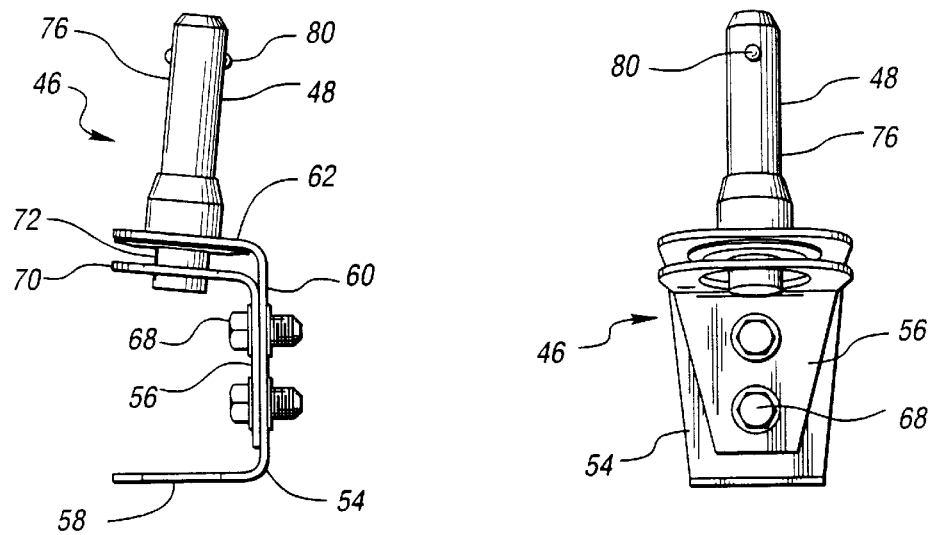
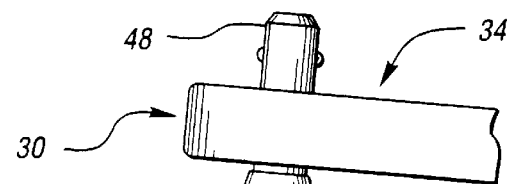
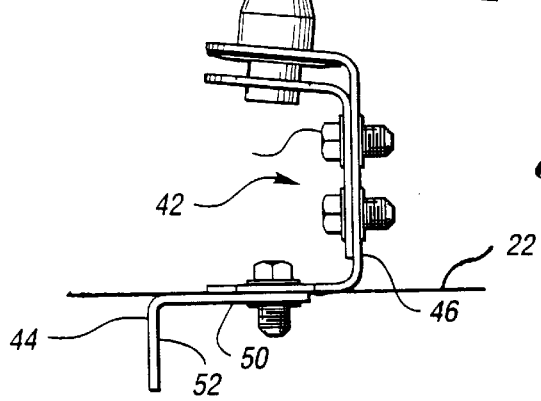

ABSTRACT
METHOD AND APPARATUS FOR RESTRAINING A CARGO BARRIER NET BEAM ASSEMBLY

TECHNICAL FIELD

The present invention relates to a restraint assembly for a cargo barrier net beam assembly for a cargo barrier net assembly for use in a cargo airplane.

BACKGROUND ART

Apparatus for retaining cargo in cargo carrying airplanes are well known in the art. Currently, the apparatus utilized in almost all cargo carrying airplanes consists of a cargo barrier net. These cargo nets are currently secured inside the airplane by attaching them both to the aircraft fuselage and the aircraft floor to distribute stress to those components when the net is subjected to force, such as cargo striking the net.

The Federal Aviation Authority (FAA) currently requires that cargo barriers, such as cargo nets, be designed to withstand the total weight of the aircraft's cargo multiplied by nine times the force of gravity (9g's). Thus, the attachments between the net and the aircraft floor and fuselage shell must be capable of distributing this relatively large load into the aircraft's basic structure.

Existing attachments of cargo net beam assemblies to the fuselage allow for unrestrained movement of the beam. This movement can cause damage to the fuselage of the airplane, depending upon the force with which the beam strikes the aircraft.

DISCLOSURE OF THE INVENTION

It is an object of the present invention to provide a cargo barrier net assembly that is more durable than prior cargo net installations and is also retrofittable with existing airplanes as applicable.

The cargo barrier net assembly includes a cargo net that is attached to the aircraft floor and the fuselage shell. The cargo net has a plurality of interwoven straps that extend both horizontally and vertically across the cargo hold. A pair of beam assemblies are also included to secure a portion of each side of the cargo net to the fuselage shell. Each beam assembly is generally C-shaped and has a primary portion and a pair of arm portions. Each of the arm portions are secured to the fuselage shell by a pin or the like. The primary portion of the C-shaped beam assembly has cargo net straps attached thereto and is attached to the fuselage shell at existing fittings already secured to the shell. Additional horizontal straps are attached to the fuselage shell above and below the beam assemblies. A plurality of vertical straps of the cargo net also span the area of the fuselage and are attached to the aircraft floor and the aircraft ceiling. The primary portion of the beam assembly is secured to the fuselage by a restraining assembly.

While an embodiment of this invention is illustrated and disclosed, this embodiment should not be construed to limit the claims. It is anticipated that various modifications and alternative designs may be made without departing from the scope of this invention.

BRIEF DESCRIPTION OF THE DRAWINGS

FIG. 4 is a perspective view of the restraining assembly to which the C-shaped beam assembly of the present invention is attached;

FIG. 5 is a top plan view of the restraining assembly of FIG. 4;

FIG. 6 is a side view of the restraining assembly of FIG. 4;

FIG. 7 is a front view of the restraining assembly of FIG. 4; and

FIG. 8 is a side view of the restraining assembly in accordance with the present invention when the retaining assembly secures the primary portion of the beam assembly to the fuselage shell.

DETAILED DESCRIPTION OF THE INVENTION

Figure 1:
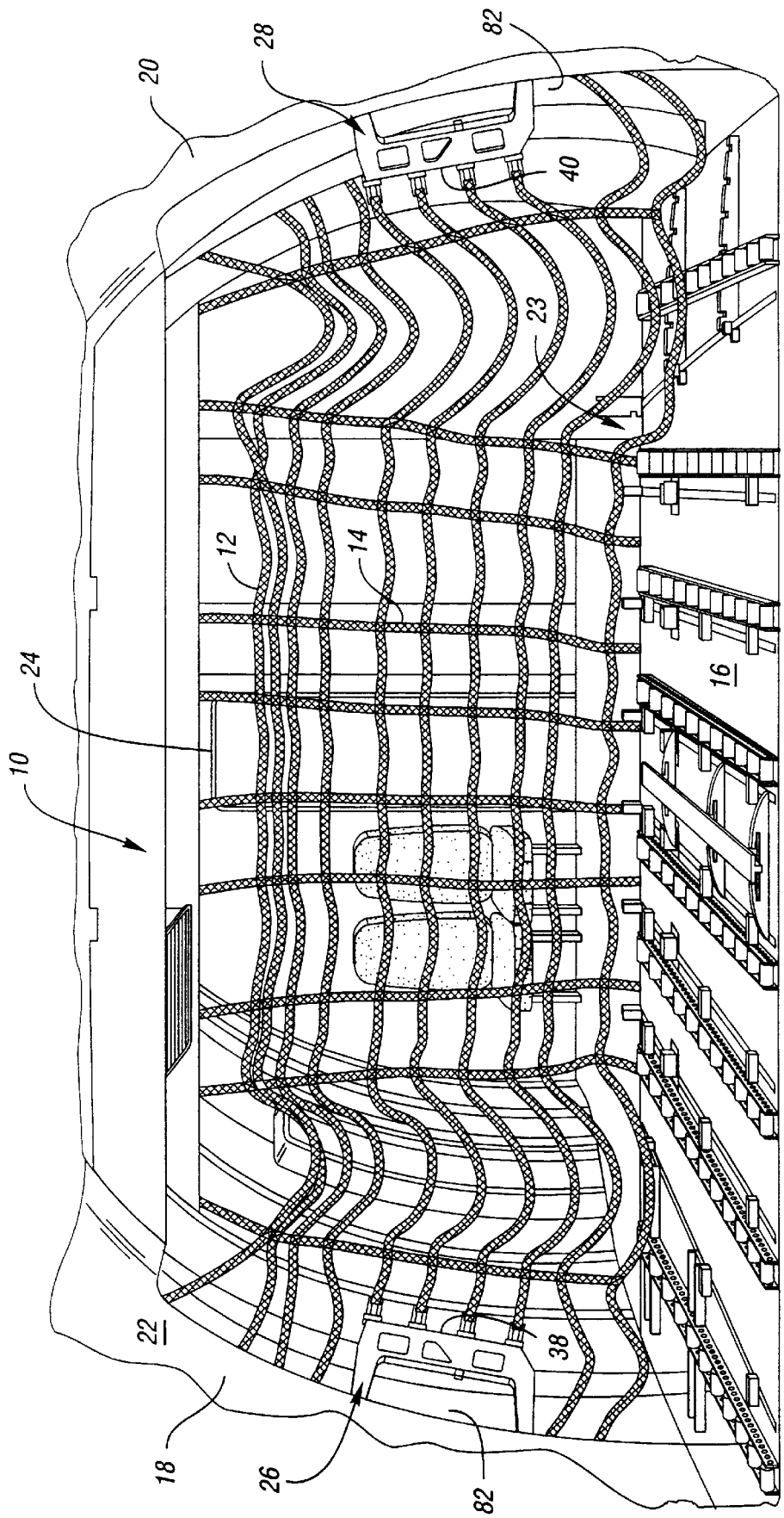
FIG. 1 is a view from the rear of the aircraft of the fuselage shell of an aircraft with a cargo barrier net secured therein in accordance with the present invention.

FIG. 1 illustrates a cargo net installation 10 in accordance with the present invention. The cargo net installation 10 includes a plurality of horizontal cargo net straps 12 and a plurality of vertical cargo net straps 14. Such straps are known in the art and can be made from any suitable material. The plurality of horizontal cargo net straps 12 substantially extend horizontally across the cargo hold 16 between either side 18, 20 of the fuselage 22. The plurality of vertical cargo net straps 14 substantially extend vertically between the fuselage 22 and the aircraft floor 23. The cargo net installation 10 is located rearward of the cockpit 24 to prevent the pilot and crew from being injured from cargo moving about the cargo hold 16 in the event of a crash. The cargo net straps and the installation thereof can also be of any other suitable construction.

Figure 2:
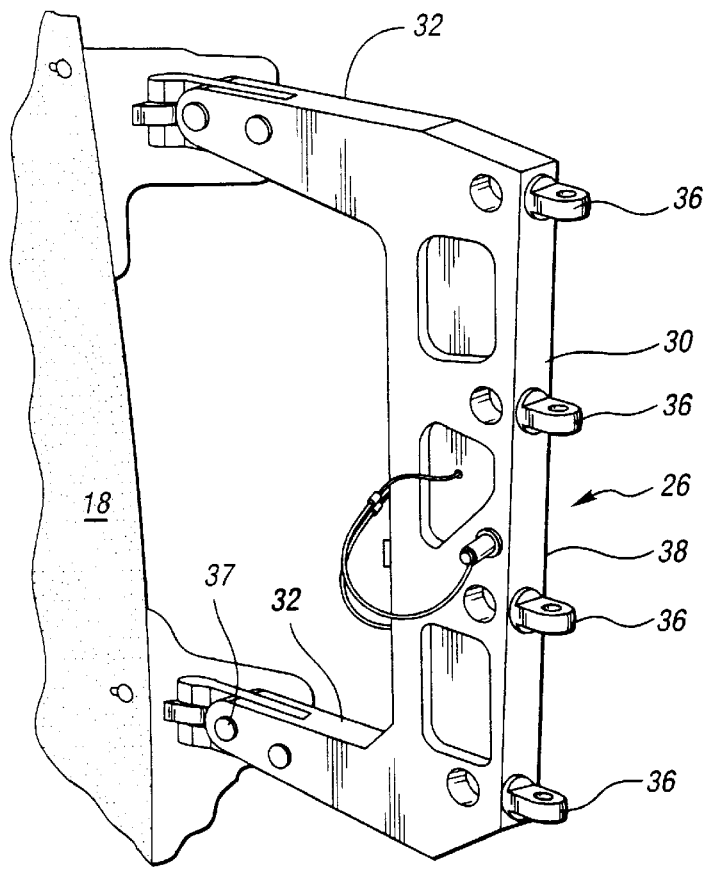
FIG. 2 is a perspective view of the C-shaped beam assembly in accordance with the present invention.
Figure 3:
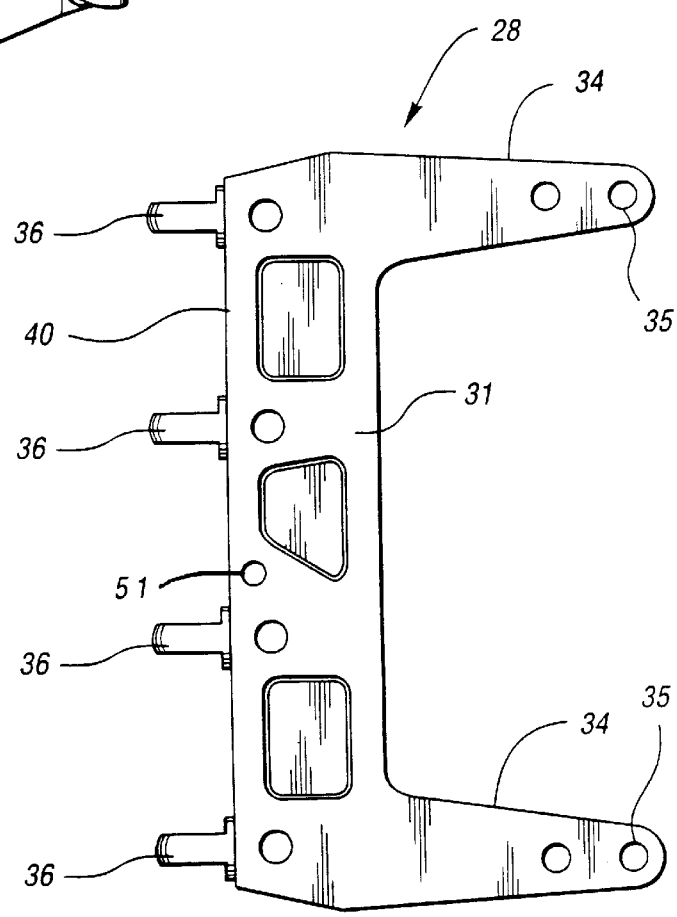
FIG. 3 is a side-elevational view of the C-shaped beam assembly of FIG. 2.

In the embodiment shown, the cargo net installation 10 includes a pair of beam assemblies 26, 28. The beam assemblies 26, 28 are generally C-shaped and are shown in FIGS. 2 and 3. A first beam assembly 26 is located on one side 18 of the fuselage 22, while a second beam assembly 28 is located on the other side 20 of the fuselage 22.

Each of the assemblies 26, 28 have a primary portion 30, 31 and a pair of secondary arm portions 32, 34. The secondary arm portions 32 of the first beam 26 are attached to the one side 18 of the fuselage 22. The secondary arm portions 34 of second beam 28 are attached to the other side 20 of the fuselage 22. Each of the secondary arm portions 32, 34 has a hole 35 formed therethrough for accommodating a pivotable connecting mechanism 37 to pivotably attach the arm portions 32, 34 to the fuselage 22. The mechanism 37 may include a hinged portion attached to the fuselage 22 that has a hole for receiving a pin or other connecting member to secure the arm portions 30, 34, to the respective fuselage side 18, 20. Alternatively, any other conventional way of pivotally attaching the arm portions 32, 34 to the fuselage may be used.

The arm portions 32 of the first beam assembly 26 are positioned such that one arm portion 32 is positioned above an aircraft window (not shown) formed in the side 18 of the fuselage, and such that the other arm portion 32 is positioned below the window. The arm portions 34 of the second restraining bracket are similarly positioned around a window framed in the other side 20 of the fuselage.

As shown, the primary portions 30, 31 of each of the beam assemblies 26, 28 are attached to a plurality of the horizontal net straps 12 at mounts 36 positioned on the beams 26, 28. However, any other suitable method of attachment could be used. The horizontal cargo net straps 12 may be secured to an edge 38 of the primary portion 30 of the first beam assembly 26 and extend across the cargo hold and attach to an edge 40 of the primary portion 31 of the second beam assembly 28.

In one preferred embodiment, four (4) of the horizontal straps 12 are attached at the edges 38, 40 of the respective beams 26, 28. However, more or fewer horizontel straps 12 may be secured to the edges 38, 40 of the assembly 26, 28 depending upon the size and arrangement of the horizontel straps, the vertical spacing between them, and the size of the beam assembly.

As shown in FIG. 8, the primary portions 30, 31 of each of the beam assemblies 26, 28 are secured to the respective side 18, 20 of the fuselage shell 22 by a restraint assembly 42. The restraint assembly 42 includes a connecting bracket 46 and a releasable connecting member 48. The releasable connecting member 48 may be a restraining pin 48 with a detent mechanism 80, which is discussed in more detail below. However, the connecting member may be any other conventional means for securing the brackets during normal use, but releasing the brackets when sufficient force is applied to the cargo net. The fuselage bracket 44 has a first portion 50 that runs generally parallel with the sides 18, 20 of the fuselage 22 and a second portion 52 that runs perpendicular thereto. The fuselage bracket 44 is already present in most cargo airplanes, allowing the present invention to be fitted into current cargo planes without incurring the expense of redesign or additional material.

Turning now to FIGS. 4 through 7, the connecting bracket 46 comprises an outer portion 54 and an inner portion 56. The outer portion 54 has three sections. The first section 58 runs generally parallel with and overlaps the first portion 50 of the fuselage bracket 44. The second section 60 runs generally perpendicular to the first section 58 and extends between the fuselage bracket 44 and the respective beam assemblies 26, 28. The third section 62 extends obliquely upward from the second section 60 at a predetermined angle. The angle varies so long as it allows for release of the beams 26, 28 in accordance with the disclosed invention. The first section 58 lies generally parallel with the first portion 50 of the fuselage bracket 44 to allow the restraining bracket 46 to be secured to the fuselage bracket 44 by a bolt, screw or any other commercially available fastening means through an opening 64 in the first section 58.

The inner portion 56 of the restraining bracket 46 has a first surface 66 that lies generally parallel with the second section 60 of the outer portion 54 such that the inner portion 56 can be secured to the outer portion 54 by securing the first surface 66 to the second section 60 by bolts 68, screws, or any other conventional securing apparatus. A second surface 70 of the inner portion 56 lies generally parallel to both the third section 62 of the outer portion 54 and the primary portion 30, 31 of each of the beam assemblies 26, 28. The second surface 70 of the inner portion 56 is separated a predetermined distance from the third section 62 of the outer portion 54 such that the head 72 of the releasable connecting member 48 is received therebetween.

The head 72 of the releasable connecting member 48 has a diameter which is larger than a hole 74 formed in the third section 62 of the outer portion 54. The diameter of the hole 74 allows the shaft 76 of the releasable connecting member 48 to pass through the hole 74, but retain and secure the head 72 between the third section 62 of the outer portion 54 and the second surface 70 of the inner portion 56. Additionally, the second surface 70 also has an opening to receive a portion of the head 72 of the releasable connecting member 48 for additional stability. The diameter of the opening in the second surface 70 is preferably smaller than the diameter of the hole 74 in the third section 62. The outer and inner portions 54, 56 of the connecting bracket 46 may be made from any suitable material such as sheet metal or the like.

In the embodiment shown, the shaft 76 of the releasable connecting member 48 passes through a hole 51 formed in the primary portion 30, 31 of the beam assemblies 26, 28. The releasable connecting member 48 has a detent 80 formed at one of the shaft 76. The detent 80 retains the beam assemblies 26, 28 in cooperation with the connecting bracket 46 when the cargo net is unstressed. This prevents the beam assemblies 26, 28 from becoming disengaged from the releasable connecting member 48 and thus rotating and banging against the side 18, 20 of the fuselage 22 during normal flight or ground conditions.

In operation, the beam assemblies 26, 28 can rotate between an outboard position adjacent the fuselage shell 22 (FIG. 1), and an inboard position, detached from the releasable connecting member 48, in the direction of a load into the cargo net. When the force from cargo or another item striking the net is large enough, the releasable connecting members 48 are designed to release the beam assemblies 26, 28 allowing them to move into the inboard direction, i.e., in the direction of the force striking the net. This also allows the cargo net to stretch to absorb and distribute the force, to keep the cargo behind the cargo net installation 10 and protect the crew forward of the net from being struck by cargo.

The fuselage preferably has a recess 82 formed therein on both sides 18, 20. The windows are located in each of the recesses 82. Additionally, as shown in the figures, the beam assemblies 26, 28 may be attached to the fuselage 22 in a respective one of the recesses 82. Because the windows are formed in the recesses 82, the cargo net straps cannot be attached directly to the fuselage. Thus, an additional support apparatus is necessary to provide the required strength for the cargo net. As discussed above, the secondary arm portions 32, 34 are positioned such that they fall above and below the window to properly disperse load from the cargo net into the fuselage shell.

While an embodiment of the invention has been illustrated and described, it is not intended that such disclosure illustrate and describe all possible forms of the invention. It is intended that the following claims cover all modifications and alternative designs, and all equivalents, that fall within the spirit and scope of this invention.

What is claimed is:

1. A cargo barrier net assembly for a cargo airplane having a floor and a fuselage shell, wherein the fuselage shell includes a first side, a second side and a top portion, the cargo barrier net assembly comprising:

a first beam assembly having a first portion rotatable attached to the first side of the fuselage shell such that a second portion of the first beam assembly is moveable between an outboard position adjacent the first side of the fuselage shell and an inboard position away from the first side of the fuselage shell;

a second beam assembly having a first portion rotatable attached to the second side of the fuselage shell such that a second portion of the second beam assembly is moveable between an outboard position adjacent to the second side of the fuselage shell and an inboard position away from the second side of the fuselage shell;

a cargo net attached to the aircraft floor, the top portion of the fuselage shell, the second portion of the first beam assembly, and the second portion of the second beam assembly;

a first releasable connecting member in cooperation with the first side of the fuselage shell and the second portion of the first beam assembly, wherein the first releasable connecting member maintains the second portion of the first beam assembly in the outboard position in a normal condition and releases the second portion of the first beam assembly to allow movement of the second portion of the first beam assembly to the inboard position when a sufficient force is applied to the cargo net; and a second releasable connecting member in cooperation with the second side of the fuselage shell and the second portion of the second beam assembly, wherein the second releasable connecting member maintains the second portion of the second beam assembly in the outboard position in the normal condition and releases the second portion of the second beam assembly to move to the inboard position when the sufficient force is applied to the cargo net, wherein each of the releasable connecting members includes a detent mechanism preventing the first and second beam assemblies from being released from the respective first and second connecting member in the absence of application of the sufficient force to the net.

2. A cargo barrier net assembly for use in an aircraft cargo area, wherein the cargo area has a floor, a side surface and a top surface, the cargo barrier net assembly comprising:

a rigid beam assembly having a first portion pivotally attached to the side surface of the cargo area and a second portion pivotable about the first portion;

a net attached to each of the floor of the cargo area, the top surface of the cargo area, and the second portion of the beam assembly; and a restraint assembly on the side surface of the cargo area, wherein the restraint assembly maintains the second portion of the beam assembly in an outboard position in a normal condition and releases the beam assembly to allow the second portion of the beam assembly to pivot to an inboard position when a sufficient force is applied to the net, wherein the restraint assembly includes a connecting member projecting at an oblique angle with respect to the side surface of the cargo area, and wherein the connecting member is received within a passageway formed in the second portion of the beam assembly.

3. The cargo barrier net assembly of claim 2, wherein the first portion of the beam assembly is defined by a pair of laterally-spaced arms extending from the second portion of the beam assembly.

* * * * *

UNITED STATES PATENT AND TRADEMARK OFFICE
CERTIFICATE OF CORRECTION

PATENT NO : 5,915,652
DATED : June 29, 1999
INVENTOR(S) : Frank Caldwell, Richard G. Diamante, Karlton Okamoto, Todd Ruckert It is certified that error appears in the above-identified patent and that said Letters Patent is hereby corrected as shown below:

Claim 1, Column 4, line 58, "rotatable" should be --rotatably--.

Signed and Sealed this

Fifth Day of December, 2000

Attest:

Attesting Officer

Q. TODD DICKINSON
Director of Patents and Trademarks